United States Patent [19]
Pines et al.

[11] Patent Number: 5,999,499
[45] Date of Patent: Dec. 7, 1999

[54] JUKEBOX WITH PRIORITY PLAY FEATURE

[75] Inventors: Andrew J. Pines, Carol Stream; Don G. Marshall, Chicago, both of Ill.

[73] Assignee: P & P Marketing, Inc., Elk Grove Village, Ill.

[21] Appl. No.: 08/135,190

[22] Filed: Oct. 12, 1993

Related U.S. Application Data

[63] Continuation of application No. 07/835,862, Feb. 18, 1992, abandoned.

[51] Int. Cl.$^6$ .................................................... G11B 17/22
[52] U.S. Cl. ............................................................ 369/34
[58] Field of Search .................... 369/34, 36, 37, 369/38; 194/217

[56] References Cited

U.S. PATENT DOCUMENTS

| | | | |
|---|---|---|---|
| 4,258,838 | 3/1981 | Rockola et al. | 369/34 |
| 4,667,802 | 5/1987 | Verduin et al. | 194/217 |
| 5,031,346 | 7/1991 | Herring et al. | 369/34 |
| 5,157,643 | 10/1992 | Suzuki | 369/36 |

FOREIGN PATENT DOCUMENTS 7901801  6/1979  Netherlands.

OTHER PUBLICATIONS

Rowe CD–100 Laser Star Field Service Manual, p. 2–29, Date Uknown.

Pioneer Laser Juke Operator's Manual CJ–V77 and CJ–V99, p. 35, Date Unknown.

*Primary Examiner*—Allen T. Cao
*Attorney, Agent, or Firm*—Gerstman, Ellis and McMillin, Ltd.

[57] ABSTRACT

A jukebox system to prioritize the playing of a selected recording is provided. A microprocessor-controlled jukebox allows a user to move a selected recording to next on a list to be played, by paying an additional fee.

1 Claim, 6 Drawing Sheets

JUKEBOX WITH PRIORITY PLAY FEATURE

This application is a continuation of U.S. application Ser. No. 07/835,862, filed Feb. 18, 1992, now abandoned, in the name of Andrew J. Pines and Don G. Marshall, for "JUKEBOX WITH PRIORITY PLAY FEATURE".

FIELD OF THE INVENTION

The present invention concerns a novel system for playing recordings in a coin-operated jukebox.

The term "jukebox" is used to encompass all coin-operated phonographs, compact disc players, tape players, video disc players, magnetic disc drives, or any other coin-operated machines for playing recorded audio or recorded audio and video from any storage medium. The term "recording" refers to any audio or visual storage medium which can be played back by any of the above players. The term "coin-operated" includes machines operated by coin or paper currency or credit card or token or any other medium of exchange or credit.

BACKGROUND OF THE INVENTION

Jukeboxes typically consist of a cabinet which contains a display of the available recordings, a mechanism for accepting valid currency, a mechanism for making selections from the available recordings, a mechanism for conveying selected recordings to a player capable of playing the recordings, some form of control unit, and the necessary audio (or audio and video) circuitry and output devices to publicly perform the selected recording.

Historically, prior to the advent of microprocessors, jukeboxes would play selections in the order that they occurred in the magazine holding the records. Each time a selection was made a flag would be tripped at that record indicating that it should be played. As the magazine was rotated, looking for a record to play, it would stop on the first flag it passed. Later, as microprocessors took over the task of controlling jukebox mechanisms, other methods of sorting the order of selections came into being, including playing them in the sequence they are made or playing them in random order.

Typically, jukeboxes provide the customer with no way of knowing how much time will pass between when a selection is made and when it is actually played. It is an object of the present invention to provide the customer with a means to ensure that his selection will be played next. The customer pays extra for this added service, which enhances the earnings of the jukebox without actually playing more selections, thus benefitting both the customer and the operator.

Other objects and advantages of the present invention will become apparent as the description proceeds.

SUMMARY OF THE INVENTION

In accordance with the present invention, a system is provided for playing recordings in a jukebox. The system comprises a housing for storing recordings, means for playing the recordings, means for transporting the recordings from the storing means to the playing means, and means for selecting recordings for play. Means for accepting credit is provided and storage means are provided for maintaining a play list of recordings selected for play and their order of play. Means are provided for prioritizing a selected recording in the play list upon the payment of additional credit.

Thus in accordance with the present invention, a means is provided for guaranteeing that a customer's selection will be played next. The selection then becomes a "priority play." In the illustrative embodiment, the feature is only available to the customer if no other selection is pending which is a priority play.

The customer is signalled as to whether the feature is active by means of a lamp or a message on a display. When the customer makes a selection and the feature is active the customer has the option of paying additional money and selecting the feature by pressing a button or some similar means. If the feature is selected, the selection is then put at the front of the list of selections to be played and the feature is deactivated. The feature remains inactive until the selection previously put at the front of the list by the feature starts playing. At that time the feature becomes active again, allowing another customer to put his selection at the front of the list.

The cost for using the feature can be set by the operator but a typical amount would be the cost of one selection. Thus, for the cost of two selections, a customer can make a selection and guarantee that it will be played next. The benefit to the customer is that he does not have to wait for his selection to be played; if he wants to hear it right away he can pay extra for the privilege. The benefit to the operator is that the jukebox is collecting extra money while playing the same number of selections, increasing revenues without increasing the basic cost for a selection or the time the jukebox is operating.

DETAILED DESCRIPTION OF THE ILLUSTRATIVE EMBODIMENTS

Figure 1:
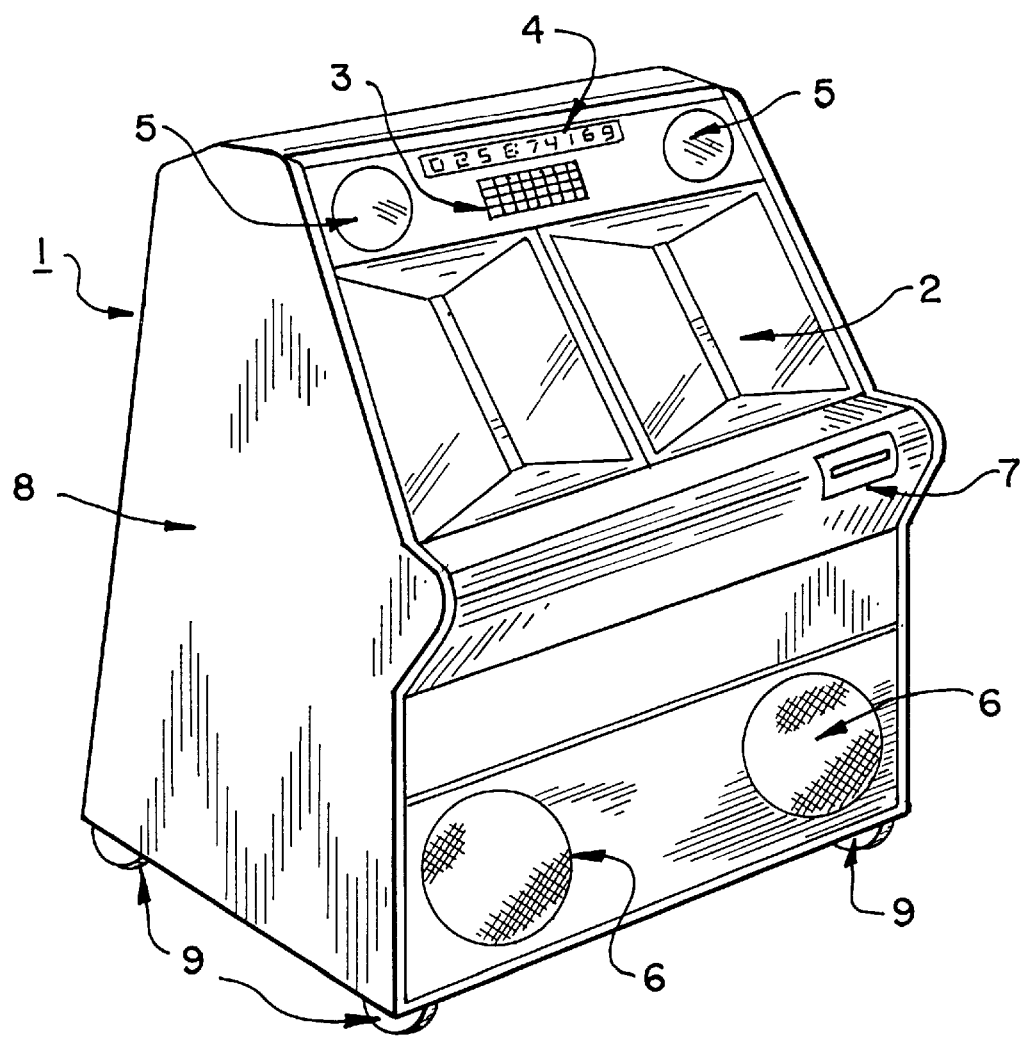
FIG. 1 is a perspective view of a jukebox constructed in accordance with the principles of the present invention.

Referring to the drawings, FIG. 1 shows a jukebox 1 which encompasses the present invention. The jukebox includes a cabinet 8 standing on casters 9 and containing a mechanism detecting customers selections, a mechanism for conveying recordings to a player, and a means for performing the recording. At the front of the cabinet is a mechanism 2 for displaying title strips and pictures to identify to the customer what recordings are available. Also at front is a bill validator 7 to identify valid currency from the customer. At the bottom of the cabinet are low-frequency speakers 6 while high frequency speakers 5 are mounted at the top. Also at the top is a keypad 3 for entering selections and a display panel 4 for passing information back to the customer.

Figure 2:
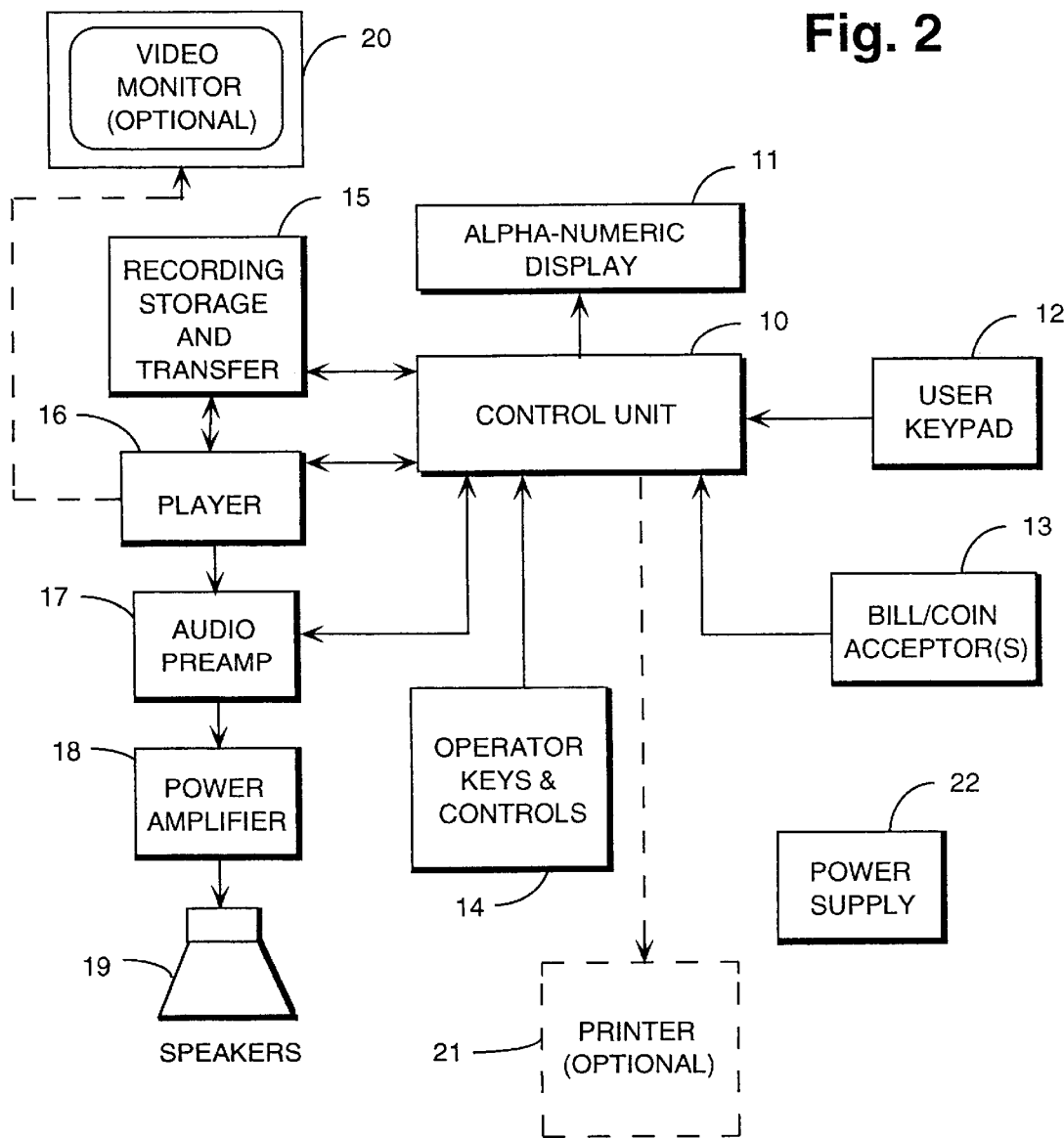
FIG. 2 is a block diagram of a microprocessor-based jukebox control system in accordance with the principles of the present invention.

FIG. 2 shows a block diagram of a microprocessor controlled jukebox system. The control unit 10 sends information to the alphanumeric display 11 to provide the customer with information regarding pricing, selections remaining, incorrect key presses, etc. The user enters selections via the keypad 12 which is read by the control unit 10. Coins or bills are validated by the bill/coin acceptor(s) 13 which signals the currency received to control unit 10. The control unit 10 activates the appropriate motors in the recording and storage unit 15 which transfers the selected recording to the player 16. The control unit 10 instructs the player 16 to play the selected recording, the audio of which is sent through the audio preamplifier 17 to the power amplifier 18 and on to the speakers 19. The video portion (if present) is sent from the player 16 to the video monitor 20. The control unit 10 also controls the volume and tone control circuits of the audio preamplifier 17. The operator may adjust the volume, tone, pricing, etc. and read audits from the control unit 10 by the operator controls 14. Optionally the audits can be printed on the printer 21. All power for all modules in the system is provided by the power supply 22.

Figure 3:
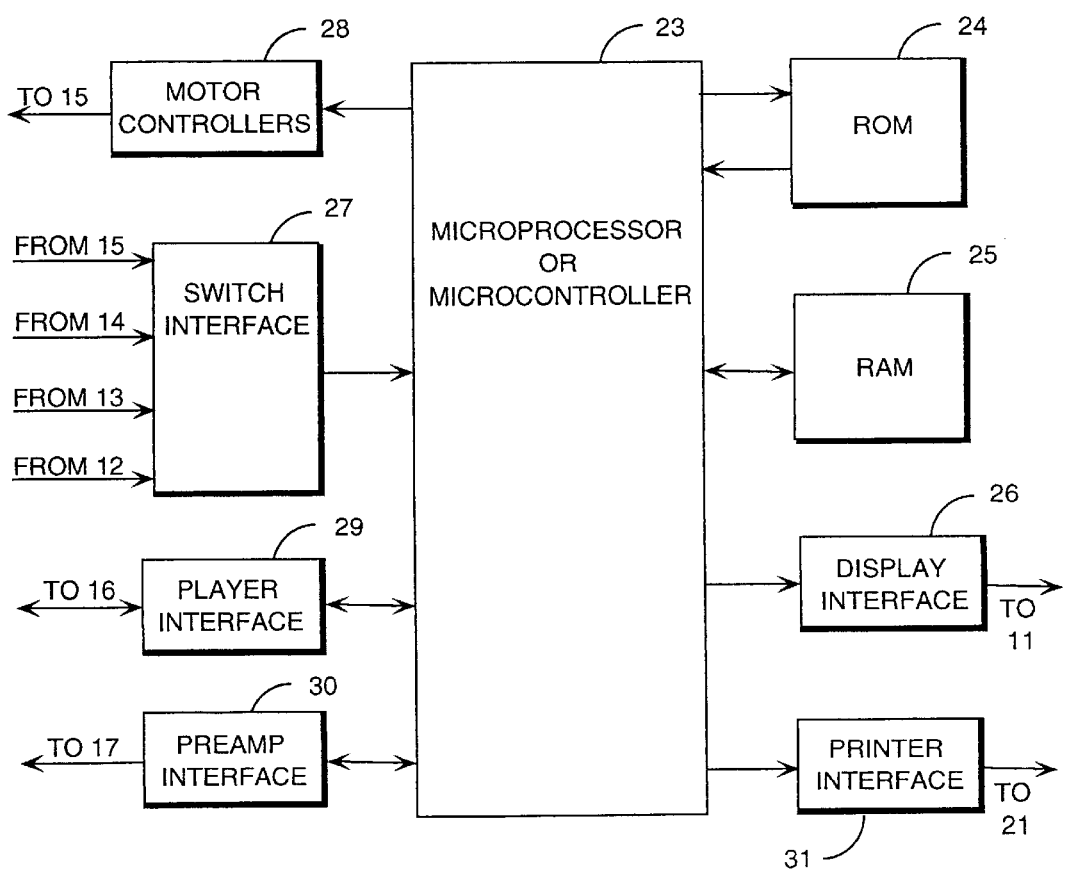
FIG. 3 is a block diagram of the control unit of FIG. 2.

FIG. 3 expands the control unit 10 from FIG. 2 into its component parts. Microprocessor or microcontroller 23 executes program instructions stored in Read-Only Memory (ROM) 24 and uses Random-Access Memory (RAM) 25 for temporary memory storage. Display interface 26 acts as the interface to the alphanumeric display 11. All of the switches from 12, 13, 14, and 15 are read through the switch interface 27. The microprocessor 23 activates the storage and transfer motors 15 by the motor controllers 28. The microprocessor 23 controls the player 16 via the player interface 29 and controls the preamp 17 via the preamp interface 30. If a printer 21 is present data is sent to it via the printer interface 31.

The software program in ROM 24 which controls the jukebox is multi-tasking; i.e. several separate tasks are executed sequentially by the microprocessor 23 by switching between the tasks at some small interval, giving the appearance of executing all tasks concurrently. The flow charts depicted in FIGS. 4, 5, and 6 are therefore considered to be executing simultaneously.

A play list is maintained which is the list of selections to be played by the jukebox. The list functions as a queue where the top of the list is the selection to be played next while the bottom of the queue is the selection to be played last.

Figure 4:
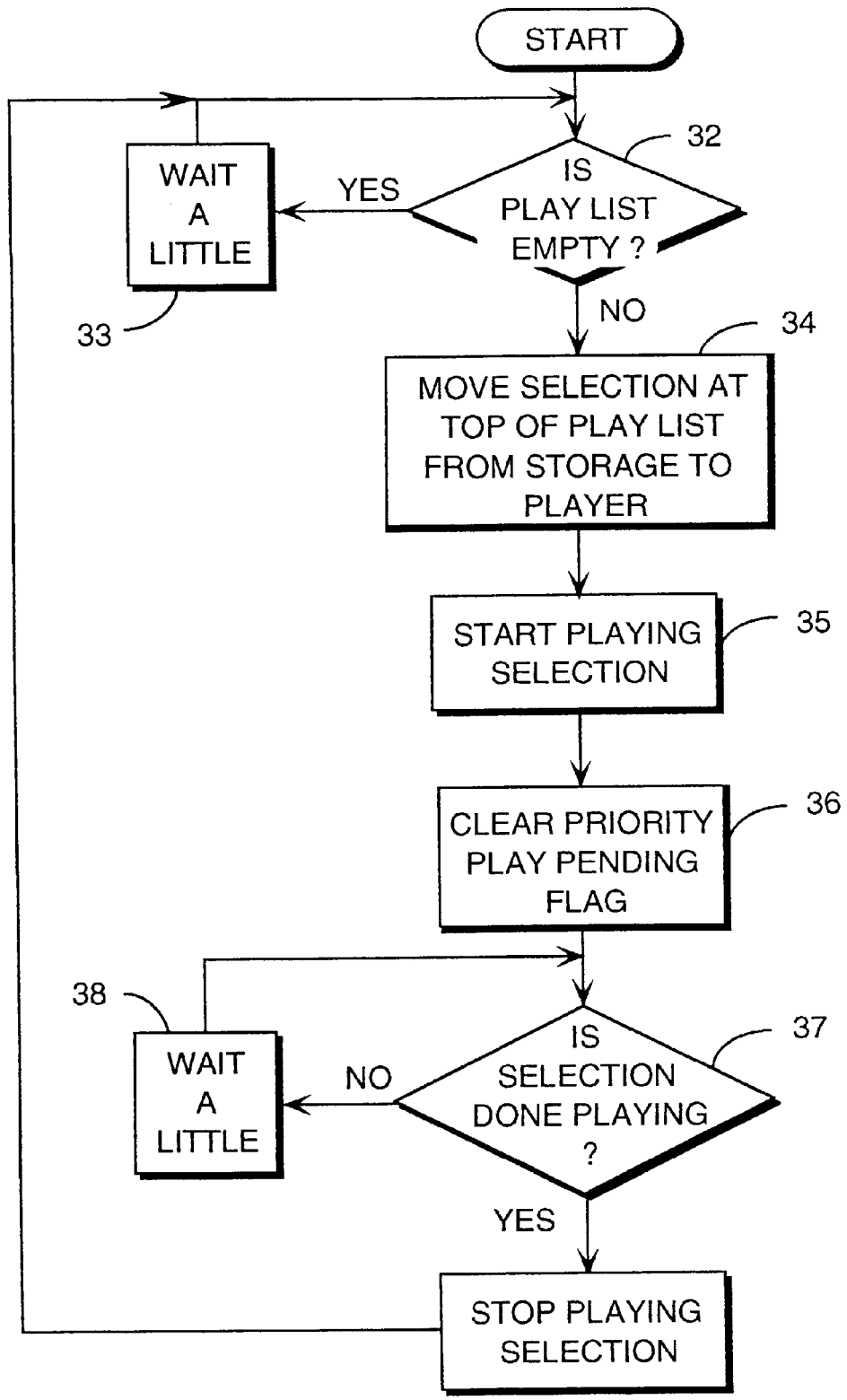
FIGS. 4, 5 and 6 are flow charts illustrating program control of selection processing and the priority play feature of the present invention.

FIG. 4 depicts the task which controls the playing of selections from the play list. First, the determination is made as to whether the play list is empty (no selections pending) 32. If so, then the system waits some short period 33 and checks again if the play list is empty 32. When the play list is not empty then the selection at the top of the play list is moved from storage to the player 34, moving any leftover previous selections from the player back to storage first. The player then starts playing the selection 35 and 36 clears the priority play pending flag, indicating that no priority play is pending. 37 checks to see if the selection has finished playing and waits in loop 38 until it has. 39 stops the selection from playing and loops back to 32 to see if any other selections are to be played.

Figure 5A:
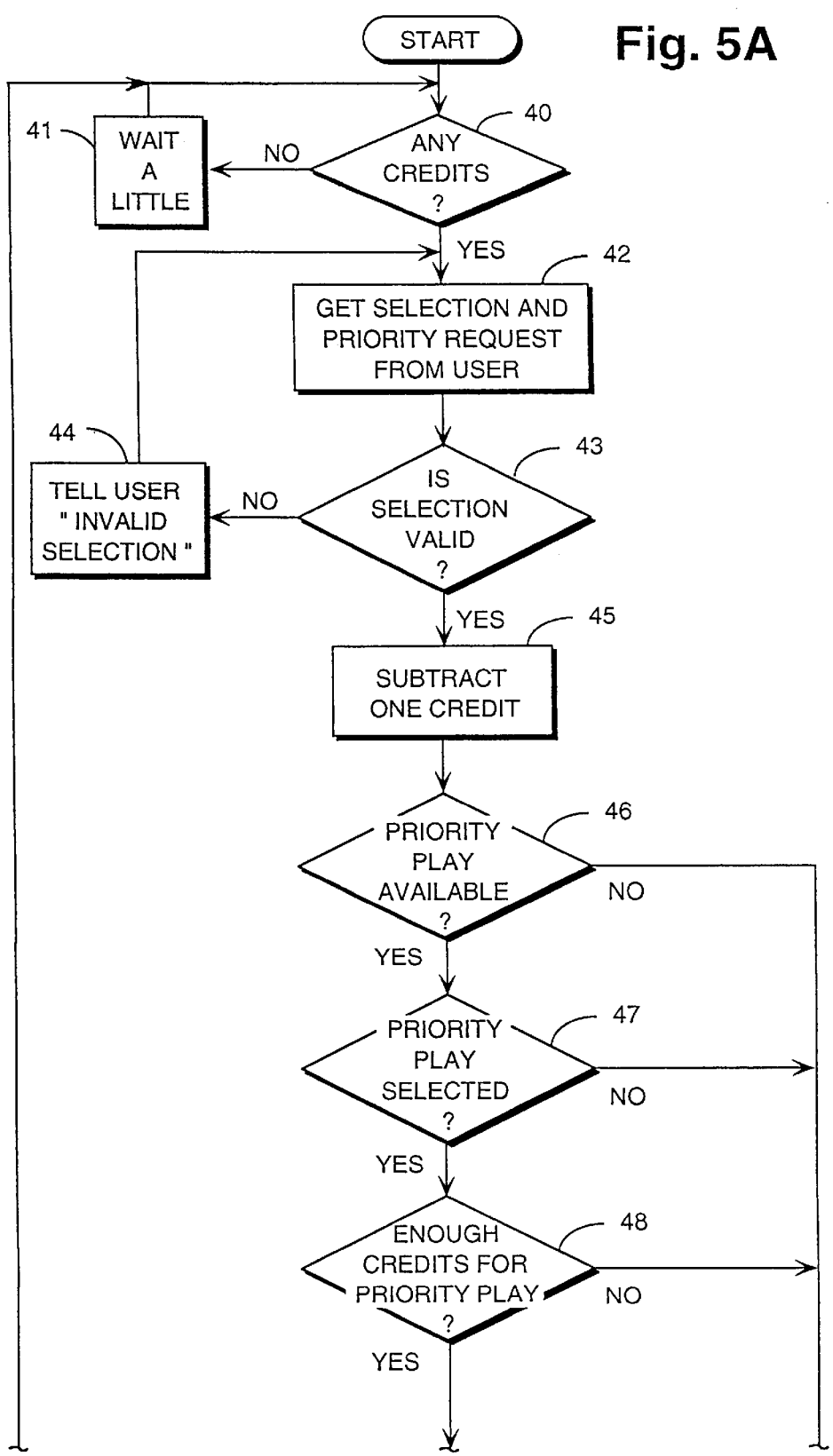
Figure 5B:
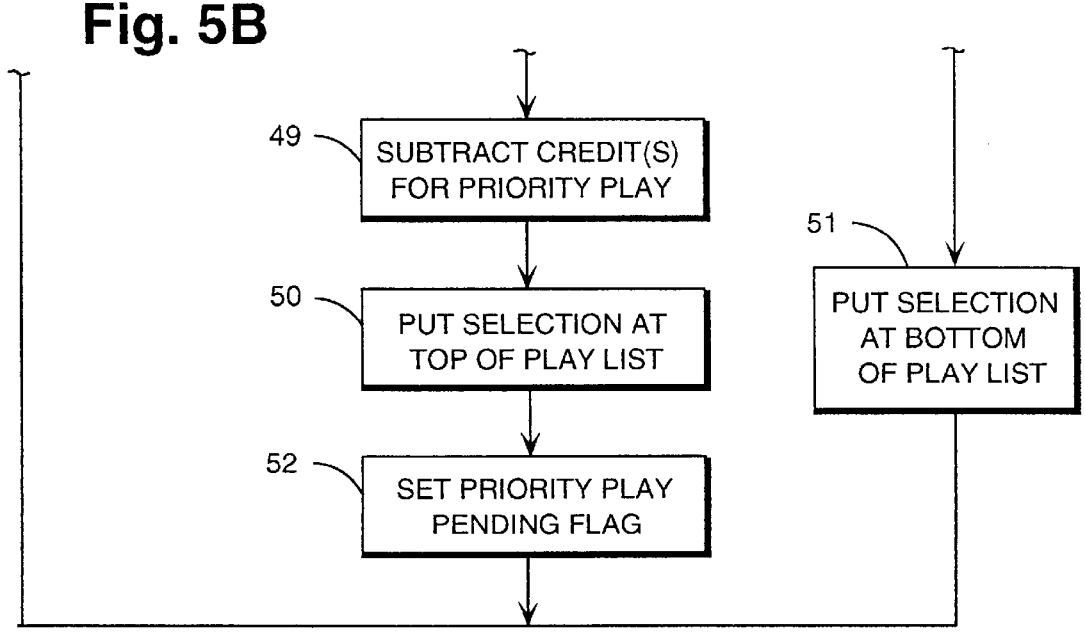
Figure 6:
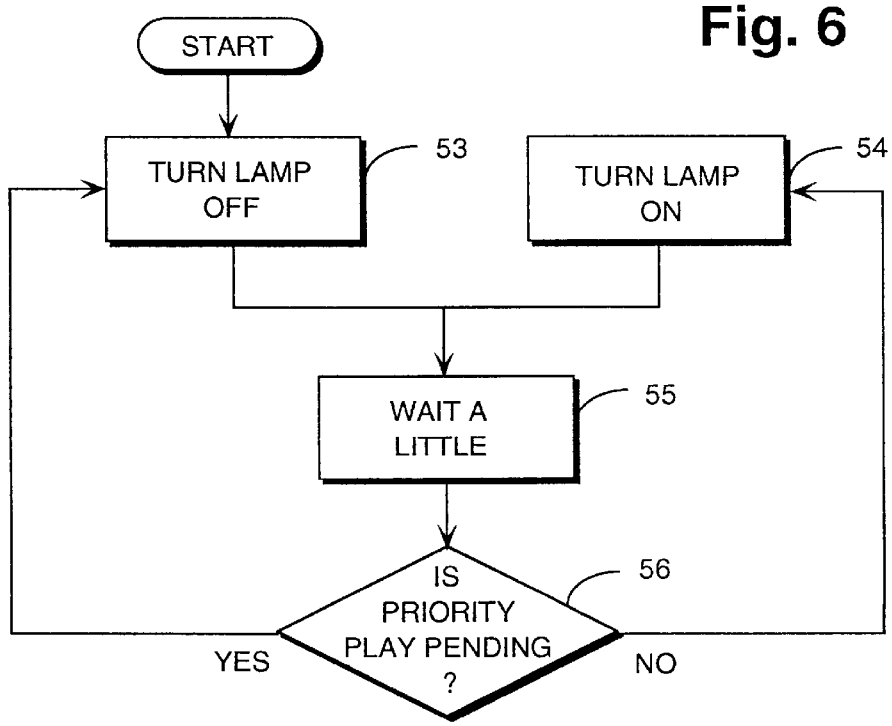

FIG. 5 shows the flow chart of the user selection acceptance task. 40 checks to see if the user has any credits and loops back 41 if not. If the user does have credits then 42 gets the selection from the user and the priority play request if the priority play pending flag is clear. 43 checks to see if the selection is valid; i.e. is the section actually available. If not, 44 tells the user that the selection was invalid and loops back to 42 to try again. 45 subtracts one credit for the valid selection. 46 checks to see if the priority play feature is available (priority play pending flag clear). If it is not available then 51 puts the selection at the bottom of the list. If priority play is available then 47 checks if the user requested priority play. If not, control goes to 51 (selection put at bottom of list). If the user did request priority play then 48 checks if the user has enough credits remaining. If not, again control goes to 51 which puts the selection at the bottom of the list. If the user does have enough money then 49 subtracts the appropriate number of credits for priority play and 50 puts the selection at the top of the list. 52 sets the priority play pending flag to indicate that a priority play request is pending. 52 and 51 both loop back to 40 to check for more credits and selections.

FIG. 6 shows the flow of control of the lamp indicating to the user when the priority play feature is available. 53 first turns off the lamp (initialization). 55 waits some short period of time then 56 checks the priority play pending flag to see if a priority play is pending. If a priority play is pending it loops back to 53 to keep the lamp off; if no priority play is pending then it loops to 54 which turns the lamp on, indicating that the priority play feature is available, then goes to 55 to wait and then check again.

Although an illustrative embodiment of the invention has been shown and described, it is to be understood that various modifications and substitutions may be made by those skilled in the art without departing from the novel spirit and scope of the present invention.

What is claimed is:

1. A system for playing recordings in a jukebox, comprising the steps of:

providing a housing for storing recordings, means for playing said recordings and means for transporting said recordings from said storing means to said playing means;

providing means for selecting recordings for play;

providing means for accepting credit;

maintaining a play list of recordings selected for play in their order of play;

playing a selected recording only after at least a predetermined amount of credit has been accepted;

determining if an amount greater than said predetermined amount has been received;

determining if the customer has selected a recording for being prioritized;

if an amount greater than said predetermined amount has been received and a customer has selected a recording to be prioritized, then prioritizing the play list;

determining if the play list has been prioritized;

determining if a recording is presently playing;

if a recording is presently playing, and if the play list has been prioritized, then placing the prioritized recording in an advanced position on the play list, whereby the prioritized selection will be played in advance of other selections which have not been prioritized.

* * * * *